Patented May 13, 1941

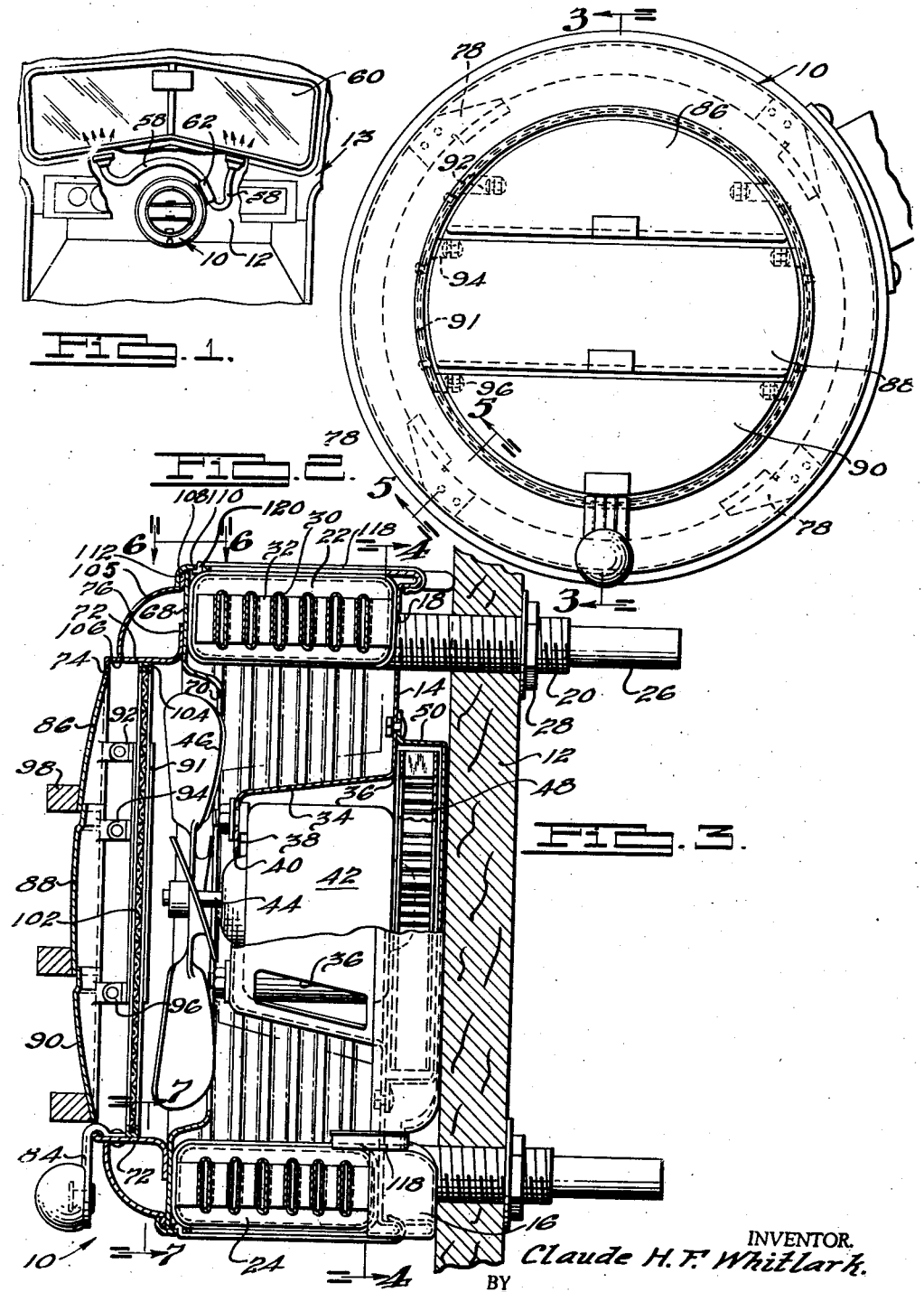

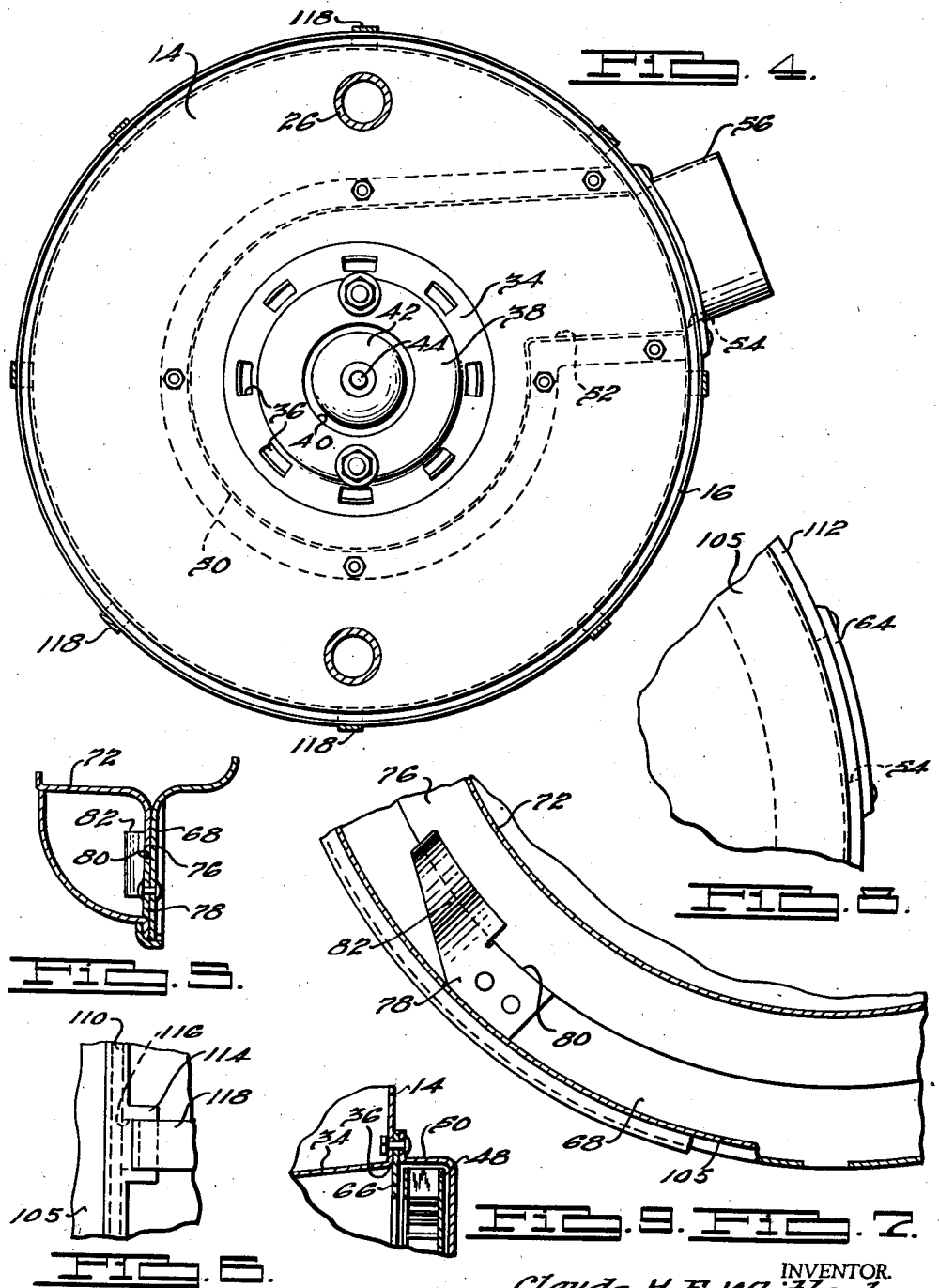

2,241,753

UNITED STATES PATENT OFFICE 2,241,753

AUTOMOBILE BODY HEATER

Claude H. F. Whitlark, Detroit, Mich., assignor, by mesne assignments, to Eaton Manufacturing Company, Cleveland, Ohio, a corporation of Ohio Application February 8, 1937, Serial No. 124,595

4 Claims. (Cl. 257—137)

This invention relates to heaters and in particular, relates to a circular radiator heater for heating the interior of automobile bodies.

Objects of the invention are to provide an auto body heater having a plurality of fans so arranged relative to the radiator core of the heater that hot air is discharged into the passenger compartment and also against the windshield to thereby maintain the interior of the body at a comfortable temperature and also to eliminate the presence of and prevent the formation of ice, frost or the like on the windshield; to mount two fans, one of the fans being of the centrifugal type, on opposite ends of a shaft of a motor in such association with the core of an auto body heater that air drawn through the core is separated into a plurality of streams, one of the streams being directed into the passenger compartment and another of the streams directed into a conduit leading to the windshield; to provide a rotatably adjustable mounting for baffles on the front of the heater so that the direction and volume of the air entering the passenger compartment may be effectively controlled; to provide a simplified structure for mounting and assembling the elements forming the heater; and to provide a heater construction which is simple to manufacture and efficient in use.

Other objects of the invention will become apparent from the following specification, the drawings relating thereto, and from the claims hereinafter set forth.

In the drawings in which like numerals are used to designate like parts in the several views throughout:

Figure 1 is a partial elevational view with parts broken away of the interior of an automobile having a heater associated therewith embodying features of the present invention;

Fig. 2 is a front elevational view of an auto body heater embodying features of the present invention;

Fig. 3 is a vertical cross-sectional view with parts in elevation taken substantially along the line 3—3 of Fig. 2;

Fig. 4 is a vertical cross-sectional view, with parts shown in elevation, taken substantially along the line 4—4 of Fig. 3;

Fig. 5 is an enlarged fragmentary cross-sectional view taken substantially along the line 5—5 of Fig. 2;

Fig. 6 is an enlarged fragmentary plan view taken substantially in the direction of the arrows 6—6 of Fig. 3;

Fig. 7 is an enlarged fragmentary cross-sectional view taken substantially along the line 7—7 of Fig. 3;

Fig. 8 is an enlarged fragmentary elevational view showing a modification of certain details of the present invention; and Fig. 9 is an enlarged fragmentary cross-sectional view illustrating a modified structure for certain details of the present invention.

The present invention relates in certain features to the structure disclosed and claimed in the co-pending application of Claude H. F. Whitlark and Frederick A. Wiehe, Jr., Serial No. 94,588, filed August 6, 1936.

In cold weather operation, it is desirable to maintain the interior of passenger vehicles in a warm condition and it is also necessary to prevent the formation of ice on the windshield to thereby eliminate a hazardous driving condition. According to the present invention, air is heated by drawing it through a hot water radiator core which is substantially circular in shape; and the heated air is then forced into the passenger compartment and also against the rear face of the windshield. A new and simplified structure for so directing the heated air is provided in the present invention by mounting two fans on the shaft of a motor mounted within the core. The forward fan forces the air outwardly through the heater opening into the passenger compartment; and the other fan is of the centrifugal type and is mounted adjacent the rear of the heater within a housing which confines the heated air therein and communicates with a conduit which carries the heated air to a position preferably at the lower inner edge of the windshield.

Also according to the present invention, improved means for rotatably mounting adjustable baffles over the outlet of the heater are provided. These means comprise a plurality of baffles, each of the baffles being independently adjustable, with means for rotating all of the baffles as a unit so that the direction and volume of air entering the passenger compartment may be effectively controlled.

For a better understanding of the invention, reference may be had to the drawings in which an automobile body heater generally designated at 10 is mounted upon a supporting member 12, which is preferably the dashboard of the vehicle 13.

The heater structure comprises a base plate 14, preferably formed of a sheet metal stamping, substantially circular in shape and having a peripheral flange 16. The base plate 14 is provided with diametrically opposed openings 18 adjacent the outer periphery thereof which have threaded bushings 20 extending therethrough. Upper and lower headers 22 and 24 respectively, are provided, and as they are substantially identical, only one needs to be described for an understanding of both.

The header 22 has substantially flat elongated sides within which transversely extending elongated openings are spaced longitudinally of the header. The header 22 is enclosed at its forward end and has a reduced substantially circular opening with an outwardly directed annular flange adjacent its rear end over which a header tube 26 is connected in communication with the interior of the header. The header tube 26 fits within the bushing 20 which in turn fits through an opening in the dash. The heater is thus held in place on the dash by means of nuts 28 or the like which may be threaded over the bushing 20.

Substantially semi-circular flattened cross tubes 30 communicate with the interior of the header through the transverse openings in the header and thus communicate the upper and lower headers with each other, and with the headers form a substantially circular core for the heater. The tubes 30 are preferably elongated in one transverse direction through the tubes so that they have flat side portions directed radially inwardly of the heater. Radiating fins 32 are secured to one of the substantially flat portions of each tube and are located in assembled position between adjacent tubes.

The radiating fins 32 are preferably formed from a sheet metal strip of a material with good heat conducting characteristics, preferably copper, and are so arranged relative to the tubes that substantially radially directed grooves or conduits are provided for passage of air from the outside through the core into the interior of the core.

The back plate 14 has a substantially central offset portion 34 providing a substantially circular opening 36 adjacent the rear face of the back plate. The offset portion 34 is provided with elongated openings 36 therethrough at spaced intervals therearound; and also has a front face portion 38 having a substantially central opening 40 therethrough.

The offset portion 34 provides a shroud for a motor 42 which is mounted therein, preferably by securing the motor to the front face portion 38 thereof in a suitable manner.

The shaft 44 of the motor 42 extends outwardly beyond each end of the motor, and a fan 46 is secured to the shaft 44 adjacent the forward end thereof for rotation with the motor shaft. A centrifugal fan 48, preferably of the Sirocco type, is also mounted on the shaft 44 for rotation therewith adjacent the rear end of the shaft. The centrifugal fan 48 is preferably of such a diameter that its outer periphery extends outwardly beyond the edge of the opening 36 for a slight distance.

A housing 50 which is substantially circular in shape for a greater portion of the circumference of the fan 48 encloses the fan 48 and is suitably secured to the rear face of the back plate 14. Referring to Fig. 3, it can be seen that the housing 50 cooperates with the back plate 14 adjacent the outer periphery of the fan 48 to form an air confining chamber for the air discharged from the centrifugal fan 48 around the periphery thereof.

Referring particularly to Fig. 4, it can be seen that the housing 50 is substantially circular in shape for a greater portion of the distance around the centrifugal fan and is provided with an outwardly extending portion or nozzle 52 which has substantially tangential communication with the chamber adjacent the outer periphery of the centrifugal fan. The portion 52 extends outwardly into contact with the inner surface of the flange 16 of the back plate 14; and an elongated opening 54 is provided through the flange 16 communicating with the conduit formed by the extending portion 52. An adapter 56 is mounted on the outer surface of the flange 16 over the opening 54 and forms a closed connection for communicating the chamber formed by the housing 50 with flexible conduits 58 which conduct the hot air to a position immediately below and behind the windshield 60 of the vehicle 13, as shown in Fig. 1.

In the embodiment illustrated in Fig. 1, a pair of flexible conduits 58 are illustrated communicating with the heater through a suitable T connection 62 and discharge through spaced openings preferably provided in the rear edge of the windshield garnish molding.

If it is not desired to provide the conduits for directing the hot air against the windshield for the purpose of defrosting the same, a modified structure is illustrated in Fig. 8 in which the adapter 56 is removed, and a cover plate 64 is secured to the back plate 14 over the opening 54 through the flanged portion 16.

A modified structure for providing the air confining chamber, or conduit, adjacent the outer periphery of the centrifugal fan 48 is illustrated in Fig. 9 in which the housing 50 and fan 48 having diameters substantially the same as the diameter of the opening 36 provided in the back plate 14 are mounted adjacent the opening 36; and an annular ring 66 is interposed between the housing 50 and the back plate 14. The annular ring 66 has an annular portion which extends radially inwardly of the outer periphery of the centrifugal fan 48 and forms with the housing 50 an air confining chamber or conduit in which the peripheral portion of the fan 48 is shrouded. By the construction shown in the modification, a slightly smaller fan and housing than the fan and housing shown in the structure illustrated in Figs. 3 and 4 may be used.

A substantially circular shroud 68 having a central opening 70 is mounted at the forward edge of the core formed by the headers 22 and 24 and the semi-circular tubes, the shroud 68 being centrally, axially, inwardly offset so that the opening 70 is positioned materially to the rear of the foremost tube and slightly to the rear and in surrounding relation to the fan 46. This materially shortens the heater in length and also confines the discharged air to the opening 70.

A door or baffle supporting ring 72, preferably formed of a sheet metal stamping is substantially circular in shape with a substantially circular opening 74 at its forward face and is provided with a radially outwardly directed annular flange 76 which is adapted to bear against the forward face of the shroud 68.

Means are provided for mounting the supporting ring 72 relative to the shroud 68 so that the supporting ring 72 may be rotatably adjusted relative to the shroud 68 and, therefore, to the forwardly facing opening of the heater core. These mounting means comprise a plurality of spring elements 78 suitably secured as by riveting, for example, to the shroud 68 adjacent the outer periphery thereof at spaced intervals therearound. Each of the spring elements 78 comprises a portion 80 having a curvature complementary in shape to that of the outer peripheral edge of the supporting ring 72 and a spring portion 82 which is adapted to resiliently engage the annular flanged portion 76 of the ring 72 adjacent the outer edge thereof. Referring particularly to Figs. 2, 5 and 7, it is evident that the portions 80 of the spring elements 78 provide supporting guides for the ring 72, and the spring portions 82 frictionally hold the ring 72 in rotatable sliding engagement with the shroud 68. A handle 84, having a knob thereon, is fixed to the supporting ring 72 and provides a means by which the ring 72 may be rotated relative to the shroud. The spring portions 82 of the elements 78 maintain the supporting ring 72 in any adjusted position.

A plurality of baffles, or doors 86, 88 and 90 are provided over the opening 74 and are pivotally mounted to the supporting ring 72 by means of hinges 92, 94 and 96, respectively. The hinges 92, 94 and 96 are fixed to the inner surface of the supporting ring 72 by means of an arcuate hinge support 91 so that the supporting ring with the baffles mounted thereon form a unitary structure. A pair of hinges are provided for each baffle so that each baffle is hingedly supported at opposite edges.

Viewing Figs. 2 and 3, the baffle 86 is preferably pivotally mounted at substantially its transverse center to its hinged support 92; and the baffles 88 and 90 are preferably pivotally mounted to their hinged supports 94 and 96 respectively, adjacent their upper edges. Means such as handles 98 are preferably provided for each of the baffles so that each of the baffles may be manually grasped and pivoted about its respective hinges.

A substantially circular screen member 102 having a ring 104 embracing the outer peripheral edge thereof is preferably mounted within the supporting ring 72 behind the baffles and forwardly of the fan 46.

A front cover 105 substantially circular in shape and having a central opening 106 is provided over the front of the core, the edge of the opening 106 engaging the outer surface of the supporting ring 72 adjacent the forward edge thereof. The outermost edge 108 of the front cover 105 is preferably flanged outwardly and engages the shroud 68 adjacent the periphery thereof.

The cover plate 105 is removably held in place on the core against the shroud by means of a ring 110 which has a portion 112 engaging the flanged portion 108 of the front cover and a portion substantially normal to the portion 112 which engages the outer peripheral edge of the shroud 68.

In order to removably hold the ring 110 in position on the core, the ring 110 is provided with inwardly offset portions 114 having openings 116 therethrough at spaced intervals around the ring. Spring strips 118 which have inwardly curved rear edges which fit within depressions in the flange 16 of the back plate 14 and have front tongues 120 which fit within the openings 116 in the portions 114.

An important advantage of using the ring 110 to hold the cover plate 105 in place is that the cost of the heater is materially reduced. The ring 110 forms a decorative chrome-plated portion; and when the face plate is constructed with an integral annular portion similar to the separate ring, it is necessary to blank out those portions of the ring it is desired to chrome plate. This is an expensive operation and is dispensed with in the present construction. Further, by providing the separate ring with the off-set portions 114, a better appearing structure results as the securing means is not visible.

In operation, the air is radially drawn into the interior of the core by means of fans 46 and 48 and is heated by the tubular elements 30 and fins 32. The air within the core is separated into two streams, one of the streams being forced outwardly through the forwardly facing opening of the core by means of the fan 46 past the baffles 86, 88 and 90 into the passenger compartment.

The direction and volume of the air entering the passenger compartment may be varied as desired by suitable adjustments of the baffles 86, 88 and 90 and suitable positioning of the supporting ring 72 by rotating the ring relative to the heater core. By the structure above described, the desired amount of hot air may be directed into the passenger compartment in any direction desired.

The fan 48 draws the heated air within the core through the openings 36 in the shroud 42 into the center of the fan and forces the air outwardly into the chamber formed by the housing 50 with the back plate 14 from which the air is directed by the conduit 58 to a position immediately behind and below the windshield.

By the structure above described, it is evident that a simplified structure has been provided by which the interior of a vehicle may be maintained at a comfortable temperature during cold weather and by which the formation of frost and ice on the windshield is prevented.

Formal changes may be made in the specific embodiments of the invention described without departing from the spirit and substance of the invention, the scope of which is commensurate with the appended claims.

What is claimed is:

1. A heater for an automobile having a windshield, comprising; upper and lower headers, a plurality of curved tubular elements connected to and communicating with said upper and lower headers forming a substantially annular core, a motor mounted within said annular core, a fan mounted on one end of the shaft of said motor, a shroud mounted on said core having a portion extending rearwardly in surrounding relation to said fan to provide a confining discharge opening for the heated air drawn through the core, a centrifugal fan mounted on the other end of said shaft, a second shroud having openings therethrough mounted in surrounding relation to said motor and communicating with the inlet of said centrifugal fan, means forming an air confining chamber adjacent the outer periphery of said centrifugal fan, and means forming a conduit communicating with said chamber and adapted for connection to an extension which extends to a position adjacent said windshield to discharge heated air against said windshield.

2. A heater for an automobile having a windshield, comprising; upper and lower headers, a plurality of curved tubular elements connected to and communicating with said upper and lower headers forming a substantially annular core, a back-plate, said back-plate having a forwardly extending portion within said core and having openings therethrough, a motor mounted within said forwardly extending portion of said back plate, a shaft for said motor extending at both ends beyond the forward and rear edges of said back plate, a fan mounted on the forward end of said shaft, a shroud mounted on the front of said core having a portion extending rearwardly in surrounding relation to said fan to provide a confining discharge opening for the heated air, a centrifugal fan mounted on the rear end of said shaft for drawing the heated air from within said core through the openings in the forwardly extending portion of said back plate, a housing mounted in surrounding relation to said centrifugal fan and cooperating with the rear of said back plate to form an air confining chamber adjacent the outer periphery of said centrifugal fan, and means forming a conduit communicating with said chamber and adapted for connection to an extension which extends to a position adjacent said windshield to discharge heated air against said windshield.

3. An automobile heater comprising an annular heat-exchange core, a casing providing covers at the ends of the core and having an air inlet opening extending peripherally of the core, one of said covers having an air delivery opening therein and the other cover having thereon a blower housing provided with an air intake opening inside the core and an air delivery nozzle extending to the outside of the casing, a motor mounted on said other cover and extending axially within the core, a propeller fan on one end of the motor shaft and arranged to operate in said delivery opening for drawing cool air in through the peripheral opening and discharging heated air at said delivery opening, and a blower on the other end of the motor shaft and operable in said blower housing for taking heated air from within the core and discharging it through said nozzle.

4. An automobile heater comprising an annular heat-exchange core, a casing providing covers at the ends of the core and having an air inlet opening extending peripherally of the core, one of said covers having an air delivery opening therein and the other cover having a hollow portion thereon extending axially within the core and provided with an air inlet opening, a housing section cooperating with said hollow portion to form a blower housing having a delivery nozzle extending to the outside of the casing, a motor disposed in said hollow portion and supported thereby, a propeller fan on one end of the motor shaft arranged to operate in said delivery opening for drawing cool air in through the peripheral opening and discharging heated air at said delivery opening, and a blower on the other end of the motor shaft and operable in said blower housing for taking heated air from within the core and discharging it through said nozzle.

CLAUDE H. F. WHITLARK.